United States Patent [19]

Nagase et al.

[11] Patent Number: 4,502,439

[45] Date of Patent: Mar. 5, 1985

[54] CONTROLLING DEVICE FOR QUANTITY OF FUEL INJECTION IN DIESEL ENGINE

[75] Inventors: Masaomi Nagase, Toyota; Hideo Miyagi, Okazaki, both of Japan

[73] Assignee: Toyota Jidosha Kabushiki Kaisha, Toyota, Japan

[21] Appl. No.: 471,667

[22] Filed: Mar. 3, 1983

[30] Foreign Application Priority Data

Apr. 2, 1982 [JP] Japan .................................. 57-54925

[51] Int. Cl.³ ............................................ F02D 31/00
[52] U.S. Cl. .................................... 123/357; 123/501; 123/502
[58] Field of Search ........................ 123/479, 357–359, 123/501, 502

[56] References Cited

U.S. PATENT DOCUMENTS 4,342,302  8/1982  Straubel et al. ..................... 123/502
4,395,905  8/1983  Fujimori et al. .................... 123/502
4,428,346  1/1984  Hoshi ................................. 123/479

FOREIGN PATENT DOCUMENTS 212337  12/1982  Japan ................................. 123/357

*Primary Examiner*—Magdalen Y. C. Moy
*Attorney, Agent, or Firm*—Oblon, Fisher, Spivak, McClelland & Maier

[57] ABSTRACT

In a controlling device wherein operating conditions in the respective parts of a Diesel engine are detected by means of sensors, injection timing of fuel is calculated from the results detected, and at the same time a control valve provided in an oil pressure circuit for controlling the timing is controlled by means of electronic control in such that an actual injection timing of fuel obtained by a timer position sensor provided on a fuel injection pump comes to be close to the injection timing calculated, a vehicle which can attain whose minimum traveling by such a way that any abnormality in the timer position sensor is decided in response to a magnitude of output signals from the timer position sensor, at the same time, any trouble or accident of a timer oil pressure circuit is decided on the basis of a difference between the calculated injection timing and the actual injection timing, and the fuel is injected after either decreasing a prescribed quantity from a target quantity of injection obtained by calculation, or decreasing a prescribed quantity from the maximum injection quantity $Q_{FULL}$ at the time of these decisions.

12 Claims, 3 Drawing Figures

CONTROLLING DEVICE FOR QUANTITY OF FUEL INJECTION IN DIESEL ENGINE

BACKGROUND OF THE INVENTION

1. Field of the Invention

The present invention relates to a controlling device for a quantity of fuel injection in a Diesel engine for controlling the quantity of fuel injection by means of electronic control in response to operating conditions in the engine.

2. Description of the Prior Art

The electronic control in Diesel engine is performed by such a manner that a deviation of a calculated injection timing obtained through the calculation by means of an electronic circuit on the basis of operating conditions of the engine from an actual control value of injection derived from a timer position sensor provided on an injection pump is found, and a driving output with respect to a timing control valve in the injection pump is changed on the basis of the deviation found in such that the actual injection timing comes to be close to the aforesaid calculated injection timing of fuel.

Incidentally, a real control value of injection timing cannot correctly be found in such a case where any trouble or accident takes place in a timer position sensor furnishing input information for an electronic circuit or in a timing control valve being an object to be controlled or in a like means, or such a case where an oil pressure circuit for effecting timer control becomes clogged by means of a deposit, dust or the like. In the case when such situations as mentioned above take place, contents of influence upon the engine become different in accordance with a state of injection timing immediately before these situations take place. For instance, chamber temperature exceeds the threshold limit value in the case where such a situation is on the side of an advance angle, whilst it brings about occurrence of accident fire, increase in white smoke, abnormal rise of exhaust temperature which becomes a cause for damaging engine in the case where a situation is on the side of a retard angle.

SUMMARY OF THE INVENTION

It is an object of the present invention to provide a controlling device for a quantity of fuel injection in a Diesel engine by which any abnormality of an injection timing control system in an injection pump is detected to intend performance of fail-safe, to thereby eliminate any adverse effect upon the engine.

According to the present invention, a vehicle can attain whose minimum traveling by such a way that any abnormality in a timer position sensor is decided in response to a magnitude of output signals from the timer position sensor, at the same time, any trouble or accident of a timer oil pressure circuit is decided on the basis of a difference between a calculated injection timing and an actual injection timing of fuel, and the fuel is injected after either decreasing a prescribed quantity from a target quantity of injection obtained by calculation, or decreasing a prescribed quantity from the maximum injection quantity $Q_{FULL}$ at the time of the aforesaid decisions.

Other objects of the present invention will become apparent in view of the following detailed description and the accompanying drawings.

DETAILED DESCRIPTION OF THE INVENTION

Figure 1:
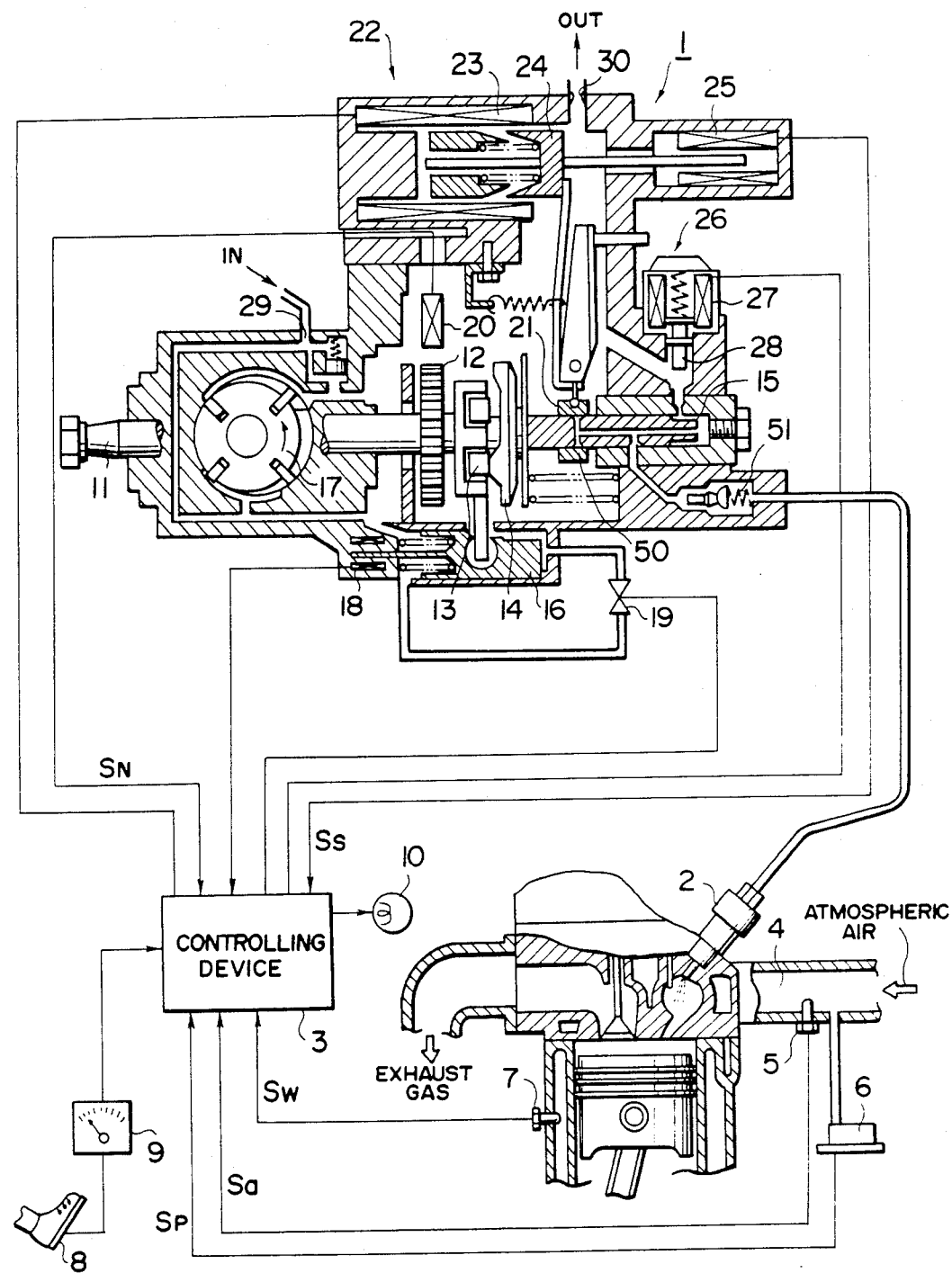
FIG. 1 is a constructional view illustrating an embodiment of the present invention.

FIG. 1 is a constructional view showing an embodiment of the present invention in which a fuel injection pump 1 comprises a driving shaft 11 driven by an engine, a gear 12 and rollers 13 mounted on an end of the driving shaft 11, a cam plate 14 connected to the rollers 13 with a play, a pump plunger 15 possessing a spill port 50 inside thereof and connected to the cam plate 14 to supply fuel into an injection nozzle 2. a fuel pump 17 for supplying fuel to the injection nozzle 2 as well as a timer piston 16, a timer position sensor 18 for electrically detecting a position of the timer piston 16, a timing control valve 19 for controlling a fuel injection timing, an electromagnetic pickup sensor 20 as a rotational speed detector for outputting pulse signal in response to a rotational speed of the gear 12, a spill ring 21 driven by a linear solenoid 22 to regulate quantity of fuel injection, the linear solenoid 22 comprising a coil and a plunger connected to the spill ring 21 for driving the spill ring 21, a spill position sensor 25 for detecting a position of the plunger 24, a fuel cut valve (hereinafter referred to simply as "FCV") 26 (being composed of an exciting coil 27 and a valve 28) for effecting on-off control of fuel suctioned by the pump plunger 15, a delivery valve 51 for preventing back flow of fuel from the pump plunger 15 and a regulating valve 29.

The cam plate 14 rotates and moves reciprocally together with the pump plunger 15. The reciprocal movement with rotation takes place by riding the cam plate 14 on the rollers 13. The position of the rollers 13 with respect to the axial direction of the driving shaft 11 is constant. Distribution of fuel is effected through the port provided inside the pump plunger 15 by rotating it. A quantity of fuel injection is determined by means of effective stroke of the pump plunger 15. An excess of the fuel in the pump is returned to the side of the pump 17 through an orifice 30. Furthermore, controls for the linear solenoid 22, the FCV 26 and the timing control valve 19 in the fuel pump 1 are carried out by means of a controlling device 3. In this respect, output signals of various sensors are introduced into the controlling device 3. These output signals may be divided broadly into two categories, i.e., information on the pump side and information on the engine side, respectively. The information on the pump side includes rotational speed signal $S_N$ of engine obtained by the electromagnetic pickup sensor 20, output signal of the timer position sensor 18, and output signal $S_s$ of the spill position sensor 25. On the other hand, information on the engine side includes output signal $S_a$ of an intake temperature sensor 5 mounted on an intake manifold 4, output signal $S_p$ of an intake pressure sensor 6 mounted similarly on the intake manifold 4, output signal $S_w$ of a water temperature sensor 7 for measuring a temperature of cooling water for engine, and output signal $S_{ACC}$ of an accelerator sensor 9 for detecting an amount of pressing an accelerator pedal 8. Some of the information on the engine side are also utilized for control of air fuel ratio.

In this respect, FIG. 1 illustrates such fact to the effect that the controlling device 3 performs control of the timing control valve 19 together with the other processings.

The timing control valve 19 is controlled by means of the controlling device 3 in such a manner that a deviation of basic injection timing $T_{BASE}$ calculated by the controlling device 3 from an actual injection timing decided on the basis of output signal of the timer position sensor 18 is made to be zero. In the case when the valve of the timing control valve 19 is opened, fuel flows into a low pressure side of the timer piston 16 so that the injection timing turns to delaying side, whilst when the valve of the timing control valve 19 is closed, the timer piston 16 is pushed towards the left direction in FIG. 1 so that the injection timing turns to advancing side. As described above, when the timing control valve 19 is controlled, the timer piston 16 is controlled so that injection timing can be changed. Futhermore, as is apparent from FIG. 1, it is understood that in the case where oil pressure system of the fuel injection pump got out of order, control of injection timing becomes an extreme control of only delaying or advancing.

Figure 2:
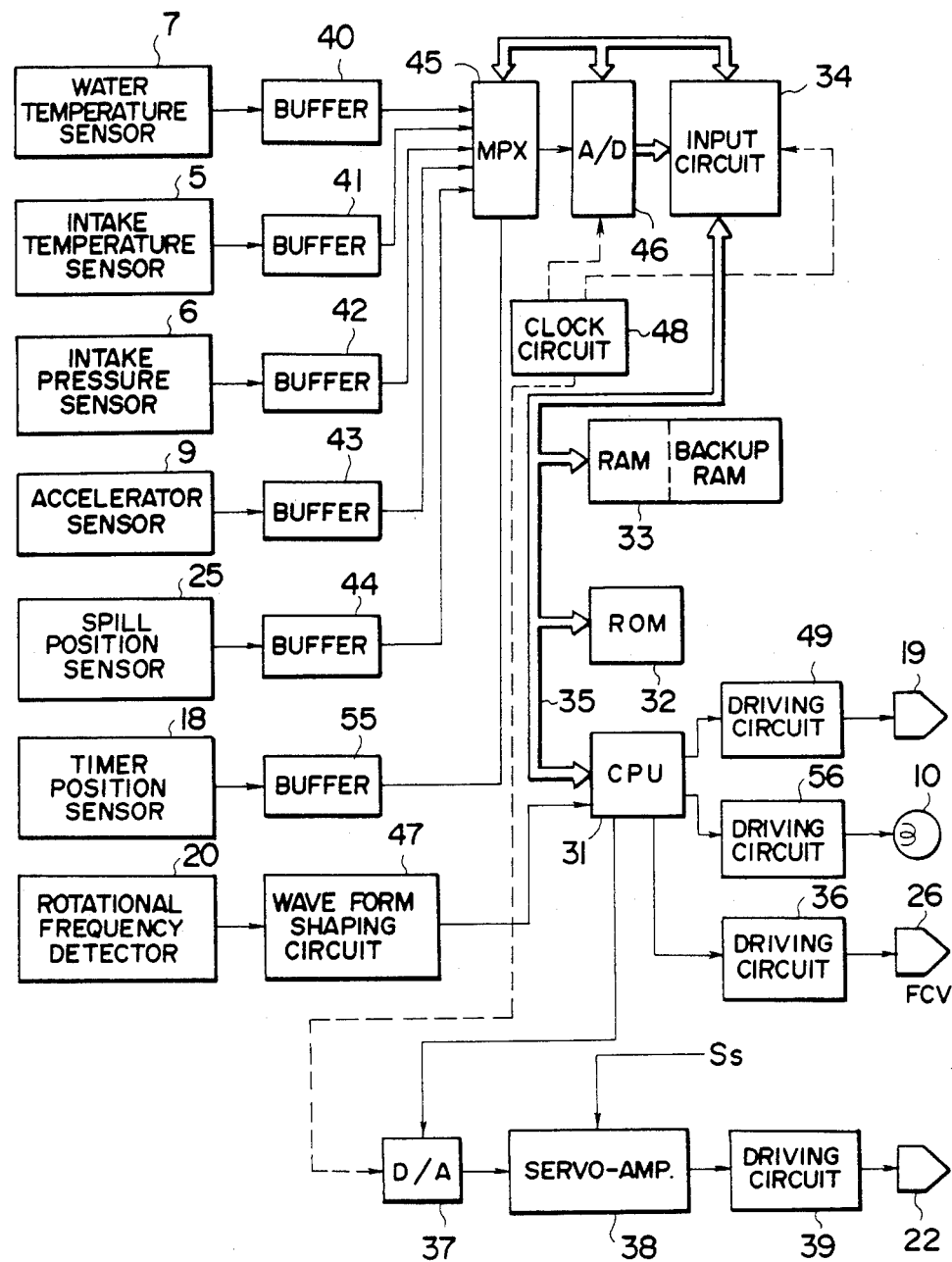
FIG. 2 is a detailed block diagram illustrating the controlling device 3 in FIG. 1.

FIG. 2 is a detailed block diagram illustrating the controlling device 3 of FIG. 1 in which the controlling device 3 has a construction of a microcomputer which comprises a central processing unit (hereinafter referred to simply as "CPU") 31 as its center, a read-only memory (hereinafter referred to as "ROM") 32 storing processing programs for executing various processings and monitoring programs, a random access memory (hereinafter referred to as "RAM") 33 which stores temporarily operated contents and output contents of the respective sensors etc. and which includes a backup memory which continues to store the operated contents, set points and the like at the time of disconnection of the power source, and an input circuit connected to the CPU 31 through a bus line 35. Output appliances connected with the CPU 31 and being subjected to control thereby include a lamp 10, the linear solenoid 22, the timing control valve 19 and the FCV 25. The FCV 26 and the timing control valve 19 are driven by way of driving circuits 36 and 49, respectively. Furthermore, the linear solenoid 22 is successively driven by way of a D/A converter 37, a servo-amplifier 38, and a driving circuit 39. On one hand, the lamp 10 is driven by means of a driving circuit 56. The input circuit 34 is the one for introducing sensor outputs and which functions to select sequentially or arbitrarily any one of outputs in the respective sensors (5, 6, 7, 9, 18 and 25) (which are fetched through buffers 40, 41, 42, 43, 44 and 55) by means of a multiplexer (hereinafter referred to as "MPX") 45 and to convert the output so selected into digital signal by an A/D converter 46, thereafter, to output the resulting data to the bus line 35. Moreover, there is provided the rotational frequency detector 20 for detecting rotational frequency of an engine, and the output signal therefrom is subjected to waveform shaping by means of a waveform shaping circuit 47, then, the resulting signal is supplied to the CPU 31. In addition, a clock circuit 48 is disposed for delivering clock pulses to the CPU 31, the input and output circuit 34, the A/D converter 46 and the D/A converter 37, respectively. In the case when any trouble is found in the injection timing control system, the lamp 10 is lighted up to inform the driver of occurence of an accident.

Figure 3:
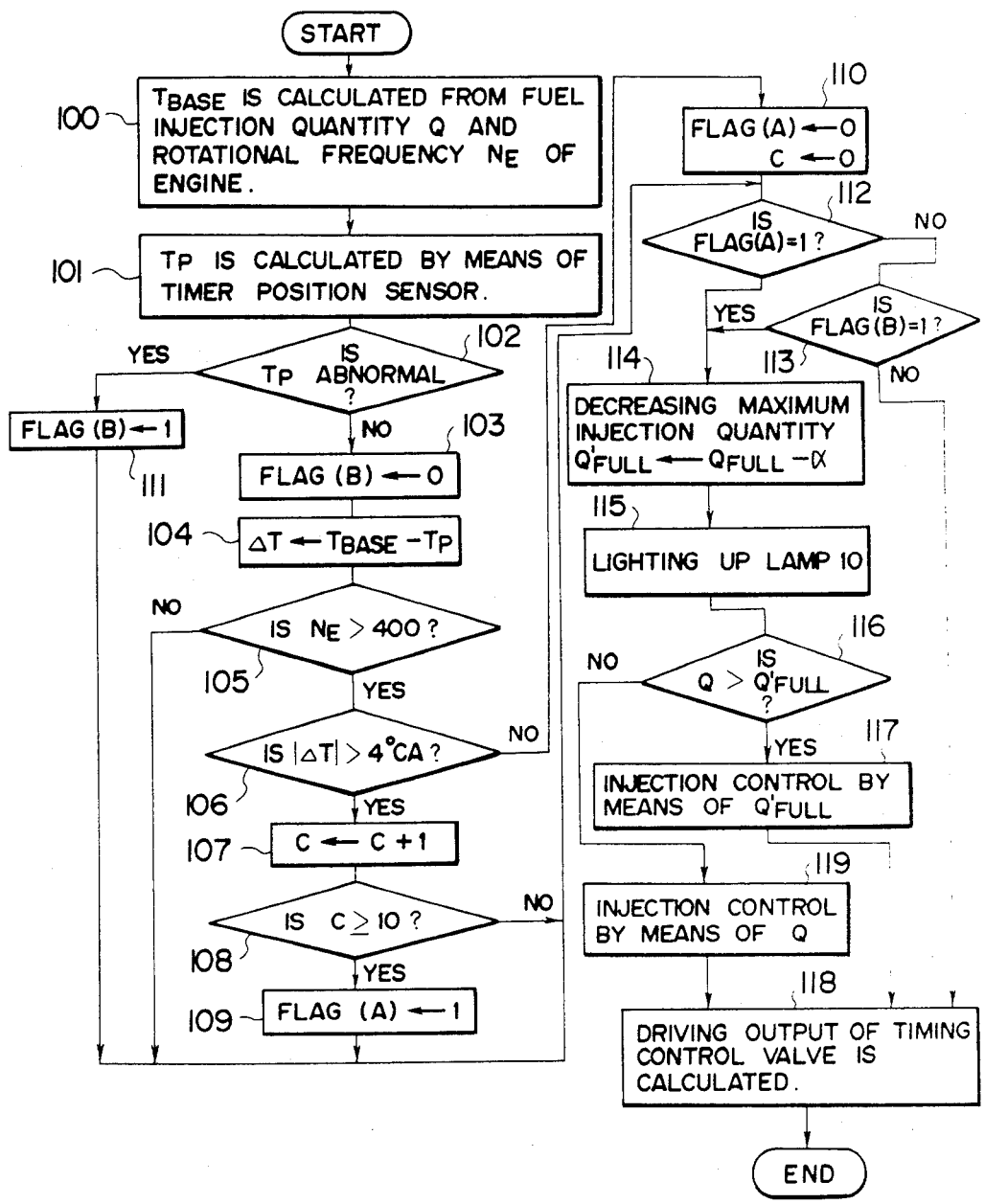
FIG. 3 is a flow chart illustrating an example of processing in accordance with the controlling device 3.

FIG. 3 is a flow chart illustrating an example of processing by utilizing the controlling device 3 in which in step 100, basic injection timing $T_{BASE}$ is calculated from a fuel injection quantity Q and a rotational speed $N_E$ of engine. In this case, the fuel injection quantity Q is calculated on the basis of an accelerator opening ACCP, i.e., an amount of depression of the accelerator pedal, and the rotational speed $N_E$ of engine. Maximum injection quantity $Q_{FULL}$ used for the processing in the succeeding step is the one for establishing a limit on the maximum side in respect of the fuel injection quantity Q. In the following step 101, the present injection timing $T_P$ is determined on the basis of output signal of the timer position sensor 18. Then, it is decided whether the present injection timing (actual injection timing) $T_P$ is abnormal or not in step 102 based on such fact whether the output signal of the timer position sensor 18 is within a certain range or not. A disconnection, short-circuit or the like of the timer position sensor 18 can be detected in accordance with the processing in the step 102. In the case where it is decided that the present injection timing $T_P$ is normal in the step 102, abnormal flag FLAG (B) of the present injection timing $T_P$ is reset in step 13. Thereafter, an error $\Delta T$ between an calculated value (=target value $T_{BASE}$) of the injection timing calculated in the step 100 and the actual injection timing $T_P$ is calculated in step 104. Moreover, in step 105, it is decided whether or not a revolving speed $N_E$ of engine is 400 rpm or more. Such decision as mentioned above is required for the following reasons. Namely, a sufficient oil pressure cannot be obtained at a low rotation of the engine, because pump oil pressure is utilized for control of such injection timing, and as a result there is a fear of increasing $\Delta T$. Further, since the engine is in starting condition at the time of low rotation in most cases, it may be considered that there is an unsatisfactory operation of the timing control valve 19. As a result of the decision in the step 105, in case of $N_E > 400$ rpm, $|\Delta T|$ is compared with an error width (for example, 4° CA) which has previously been set in step 106. In case of $|\Delta T| > 4°$ CA, i.e., case of abnormality, it is decided how many times (or how many seconds) are in (or continue) such situation. The decision may be effected by such a manner that the number of times in continuation of abnormality is counted in step 107, and it is decided whether or not the aforesaid number of times reaches the number of times which has been previously set in step 108 (for instance, 10 times). And when the number of times counted reaches the number of times preset, oil pressure system accident flag FLAG (A) is set. Because of setting of the FLAG (A), it is confirmed that any accident takes place in the oil pressure system. On the other hand, if the condition is such that $|\Delta T| > 4°$ CA, the processing proceeds into step 110 so that the oil pressure system accident flag FLAG (A) and a counted value of the counter are reset. Furthermore, in the case where abnormality of the actual injecting timing $T_P$ was decided in the step 102, the abnormal flag FLAG (B) of the present injection timing $T_P$ is set in step 111. After effecting the respective processings through the steps 108, 109, 110 and 111, the process proceeds into step 112.

In the step 112, it is confirmed whether the FLAG (A) has been set or not, in other words, whether there has been a trouble or not in the oil pressure system. If there is a trouble, the processing proceeds into step 114. Moreover, in the case where the FLAG (A) is in reset state, it is confirmed whether the FLAG (B) has been set or not in step 113, i.e., whether there has been a trouble or not in the timer position sensor 18. If there is any trouble, the processing proceeds into the step 114. When either the FLAG (A) or the FLAG (B) is in set condition, a processing for decreasing the maximum injection quantity $Q_{FULL}$ is executed in the step 114. The quantity to be decreased herein is a quantity $\alpha$ per injection (for example, 10 mm$^3$/ST), which is determined in accordance with $(Q_{FULL} - \alpha) \rightarrow Q'_{FULL}$, and control of fuel injection is carried out based on the value thus obtained. On one hand, the lamp 10 is lighted up in step 115 in order to inform the driver of the like of occurence of any trouble. The $Q'_{FULL}$ obtained in the step 114 is compared with the fuel injection quantity Q in step 116. In the case where $Q > Q'_{FULL}$, the linear solenoid 22 is driven based on the value of the $Q'_{FULL}$ in step 117 to effect control of fuel injection, whilst in the case where $Q < Q'_{FULL}$, the linear solenoid 22 is driven on the basis of the value of the Q to carry out the control of fuel injection. Although the above embodiment was the one in which control for decreasing a quantity of fuel was effected with respect to the maximum injection quantity thereof, it may be modified in such that the fuel injection quantity Q is decreased by a prescribed quantity.

When both the FLAG (A) and FLAG (B) are in reset condition, in other words, when the timer position sensor 18 and the oil pressure system are normal, the processing proceeds into step 118 as well as after completing the respective processings in the steps 117 and 119, the processing proceeds also into the step 118. In this step 118, a driving output of the timing control valve 19 is calculated in response to $\Delta T$, and the value thus calculated is outputted to the driving circuit 49. In this case, both duty pulse according to integral operation and duty pulse in accordance with proportional operation are determined on the basis of deviation $\Delta T$ to add the resulting values one another, and the preceding duty pulse is further added to the above value added to calculate driving output of the timing control valve 19.

As is apparent from the above description, according to the present invention, damage of an engine due to troubles in whose timer position sensor and oil pressure circuit can be prevented, and alarm may be performed in respect of any trouble. Besides, since such control which is appropriate to types of troubles is carried out, white smoke, accident fire or the like can be prevented.

In the above embodiment, although the case wherein the lighting processing of lamp for the information of troubles was effected in package processing irrespective of the contents of a trouble or an accident has been illustrated, alarms may also be individually carried out in response to the contents of troubles or accidents. In such cases, steps for effecting similar processings to that of the step 115 are provided to the following stages of the steps 112 and 113. In addition, instead of the lamp, alarm may be performed by sounding a buzzer or the like for a period of a certain time at the same time of taking place of any trouble or an accident.

Although a preferred embodiment of the invention has been illustrated and described, various modifications and changes may be made without departing from the spirit of the invention or the scope of the appended claims, and each of such modifications and changes is contemplated.

What is claimed is:

1. A controlling device for quantity of fuel injection in a diesel engine having a fuel injection pump including:

a timer means for controlling an actual fuel injection timing in accordance with a position of said timer, said position being changed on the basis of an oil pressure applied to said timer through an oil pressure circuit;

a timer position sensor for detecting said position of said timer to produce a position signal indicative of said position of said timer; and a means for injecting fuel in accordance with a drive signal indicative of a final quantity of fuel injection; wherein said controlling device comprises:

a means for calculating a quantity of fuel injection and a maximum injection quantity in accordance with an engine operating condition;

a means for deciding any trouble or accident of said timer position sensor on the basis of said position signal;

a means for deciding any trouble or accident of said oil pressure circuit based on such a fact that a deviation of an injection timing calculated on the basis of operating conditions in the respective parts of said Diesel engine detected by sensors from said actual injection timing determined on the basis of said position signal is more than a set point which has previously been set;

a means for subtracting by a predetermined quantity from said maximum injection quantity at the time of deciding any of said troubles or accidents; and a means for selecting less quantity out of the calculated quantity of fuel injection and the maximum injection quantity and producing said drive signal in accordance with the quantity thus selected.

2. A controlling device for quantity of fuel injection in a Diesel engine as claimed in claim 1, wherein said deviation is compared with said set point at only the time when a rotational speed of said engine is more than a predetermined set level.

3. A controlling device for quantity of fuel injection in a Diesel engine as claimed in claim 1, wherein any trouble or accident of said oil pressure circuit is decided at only the time when the number of times in such occasion that said deviation exceeds said set point is more than a predetermined number of times.

4. A controlling device for quantity of fuel injection in a Diesel engine as claimed in claim 1, further comprising an alarm lamp turned on when any troubles or accidents is decided.

5. A controlling device for quantity of fuel injection in a Diesel engine as claimed in claim 1, wherein said quantity of fuel injection is calculated on the basis of a rotational speed of the engine and an amount of depression of an accelerator pedal.

6. A controlling device for quantity of fuel injection in a Diesel engine as claimed in claim 5, wherein said maximum injection quantity is calculated on the basis of the rotational speed of the engine and an intake pressure of an intake manifold.

7. A controlling device for quantity of fuel injection in a diesel engine having a fuel injection pump comprising:

a timer means for controlling an actual fuel injection timing in accordance with a position of said timer, said position being changed on the basis of an oil pressure applied to said timer through an oil pressure circuit;

a timer position sensor for detecting said position of said timer to produce a position signal indicative of said position of said timer; and a means for injecting fuel in accordance with a drive signal indicative of a final quantity of fuel injection; wherein said controlling device comprises:

a means for calculating a quantity of fuel injection and a maximum injection quantity in accordance with an engine operating condition;

a means for deciding any trouble or accident of said timer position sensor on the basis of said position signal;

a means for deciding any trouble or accident of said oil pressure circuit based on such a fact that a deviation of an injection timing calculated on the basis of operating conditions in the respective parts of said diesel engine detected by sensors from said actual injection timing determined on the basis of said position signal is more than a set point which has previously been set;

a means for subtracting by a predetermined quantity from said calculated quantity of fuel injection at the time of deciding any of said troubles or accidents; and a means for selecting a less quantity out of the calculated quantity of fuel injection and the maximum injection quantity and producing said drive signal in accordance with the quantity thus selected.

8. A controlling device for quantity of fuel injection in a diesel engine as claimed in claim 7, wherein said deviation is compared with said set point at only the time when a rotational speed of said engine is more than a predetermined set level.

9. A controlling device for quantity of fuel injection in a diesel engine as claimed in claim 7, wherein any trouble or accident of said oil pressure circuit is decided at only the time when the number of times in such occasion that said deviation exceeds said set point is more than a predetermined number of times.

10. A controlling device for quantity of fuel injection in a diesel engine as claimed in claim 7, further comprising:

an alarm lamp turned on when any one of troubles or accidents is decided.

11. A controlling device for quantity of fuel injection in a diesel engine as claimed in claim 7, wherein said quantity of fuel injection is calculated on the basis of a rotational speed of the engine and an amount of depression of an accelerator pedal.

12. A controlling device for quantity of fuel injection in a diesel engine as claimed in claim 4, wherein said maximum injection quantity is calculated on the basis of the rotational speed of the engine and an intake pressure of an intake manifold.

* * * * *